United States Patent
Ho et al.

(10) Patent No.: US 7,560,917 B2
(45) Date of Patent: Jul. 14, 2009

(54) CURRENT FEED-THROUGH ADAPTIVE VOLTAGE POSITION CONTROL FOR A VOLTAGE REGULATOR

(75) Inventors: Hsin-Hsin Ho, Sanchung (TW); Liang-Pin Tai, Tainan (TW); Hung-I Wang, Changhua (TW); Jian-Rong Huang, Hsinchu (TW); Jiun-Chiang Chen, Houli Township, Taichung County (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 11/220,561

(22) Filed: Sep. 8, 2005

(65) Prior Publication Data

US 2006/0049815 A1 Mar. 9, 2006

(30) Foreign Application Priority Data

Sep. 9, 2004 (TW) ............................. 93127269 A

(51) Int. Cl.
*G05F 1/618* (2006.01)
(52) U.S. Cl. ........................... 323/285; 323/288; 363/41
(58) Field of Classification Search ................ 323/285, 323/288, 282–284; 363/41
See application file for complete search history.

(56) References Cited

U.S. PATENT DOCUMENTS

| 6,366,070 | B1 * | 4/2002 | Cooke et al. | ................. 323/284 |
| 6,728,121 | B2 * | 4/2004 | Ben-Yaakov et al. | .......... 363/89 |
| 6,873,140 | B2 * | 3/2005 | Saggini et al. | ............... 323/283 |
| 7,098,631 | B2 * | 8/2006 | Cohen | ......................... 323/222 |
| 7,245,113 | B2 * | 7/2007 | Chen et al. | .................... 323/271 |
| 2004/0051510 | A1 * | 3/2004 | Saggini et al. | ............... 323/282 |

* cited by examiner

*Primary Examiner*—Akm E Ullah
*Assistant Examiner*—Harry Behm
(74) *Attorney, Agent, or Firm*—Rosenberg, Klein & Lee

(57) ABSTRACT

In a voltage regulator including an error amplifier to generate a first signal related to an output voltage of the voltage regulator, a current sense circuit to generate a second signal related to an inductor current of the voltage regulator, and a PWM comparator to generate a PWM signal in response to the first and second signals to regulate the output voltage, a current feed-through adaptive voltage position control comprises supplying ramp signal and offset signal to modify the PWM signal to thereby eliminate the offset of the output voltage.

10 Claims, 11 Drawing Sheets

CURRENT FEED-THROUGH ADAPTIVE VOLTAGE POSITION CONTROL FOR A VOLTAGE REGULATOR

FIELD OF THE INVENTION

The present invention is related generally to a voltage regulator and more particularly to a control method and apparatus for a low gain current mode voltage regulator.

BACKGROUND OF THE INVENTION

Voltage regulator has been applied in various electronic products to serve as power supply for providing stable supply voltage. However, spike will be generated on the output voltage of voltage regulator in load transient resulted from instant load change, and large voltage spike may damage the load on the voltage regulator. FIG. 1 shows waveform 100 of the output voltage of a conventional voltage regulator in load transient. At time T1, the load on the voltage regulator changes from light to heavy, and the output voltage of the voltage regulator drops down ΔV instantly, and then recovers to the original level gradually. At time T2, the load on the voltage regulator changes from heavy back to light, the output voltage of the voltage regulator jumps up ΔV instantly, and then recovers to the original level gradually. Therefore, the output voltage of a conventional voltage regulator changes with 2ΔV in load transient. To improve the ripple of output voltage generated in load transient, large output capacitor is required, and this will increase the size and cost of the voltage regulator. Alternatively, Intel proposed an adaptive voltage position (AVP) control, which uses voltage droop to reduce the output voltage spike of voltage regulator. FIG. 2 shows a conventional current mode voltage regulator 200 having voltage droop function, in which switches SW1 and SW2 are coupled between input voltage PVDD and ground GND, signals UG and LG switch the switches SW1 and SW2 to produce inductor current IL flowing through inductor L to charge output capacitor C to thereby produce output voltage Vout, error amplifier 202 generates error signal COMP from the difference between the output voltage Vout and reference voltage Vref, transconductive amplifier 212 serves as current sense circuit whose two inputs are coupled to the two ends of sense resistor Rs coupled in series to the inductor L to sense the inductor current IL to thereby generate current sense signal VCS, pulse width modulation (PWM) comparator 204 compares the error signal COMP with the current sense signal VCS to generate PWM signal for the reset input R of SR latch 206, fixed-frequency clock CLK is provided for the set input S of the SR latch 206, and the SR latch 206 produces the signals UG and LG by its outputs Q and QN to switch the switches SW1 and SW2 with drivers 208 and 210, respectively.

FIG. 3 shows waveforms of the load current IRL and output voltage Vout of the voltage regulator 200 in load transient, in which waveform 214 represents the load current IRL, and waveform 216 represents the output voltage Vout. Referring to FIGS. 2 and 3, the load RL on the voltage regulator 200 changes from light to heavy at time T1, the load current IRL increases eventually, and the output voltage Vout drops down with the voltage drop $$\Delta V = IRL \times Resr \qquad \text{[EQ-1]}$$

where Resr is the parasitic resistor of the output capacitor C. Assuming that the error amplifier 202 has gain M, and the transconductive amplifier 212 has gain K, the output voltage Vout will drop down to the level $$Vout' = Vout - IRL \times Resr \times \frac{K}{M}. \qquad \text{[EQ-2]}$$

After the output voltage Vout drops down, it will maintain at the lower level Vout' until the load RL changes from heavy back to light at time T2, and then the output voltage Vout recovers back to the original level. By comparing FIG. 3 with FIG. 1, it is shown that the ripple of the output voltage Vout of the voltage regulator 200 in load transient is less than 2ΔV. In other words, a voltage regulator having voltage droop function may reduce the ripple of the output voltage significantly. Therefore, the voltage regulator may use smaller output capacitor C.

However, this method is only applicable for high gain voltage regulator. If the voltage regulator 200 is a low gain voltage regulator, it will not be able to reduce the ripple effect resulted from the error signal COMP and current sense signal VCS owing to the error amplifier 202 having not enough gain M, resulting in offset on the output voltage Vout. FIG. 4 shows waveforms of the error signal COMP and current sense signal VCS when the gain M of the error amplifier 202 is not large enough. When the switch SW1 turns on, the current sense signal VCS increases, as shown by waveform 302, and the error signal COMP decreases, as shown by waveform 300. Once the current sense signal VCS equal to the error signal COMP, the switch SW1 turns off, and the output voltage Vout begins to decrease, causing the error signal COMP to increase, and the current sense signal VCS to decrease. If the touch point of the error signal COMP and current sense signal VCS is not present when the load RL is zero, the output voltage Vout will have an offset apart from the reference voltage Vref in the magnitude of $$\begin{aligned} Voffset &= \Delta V1 + \Delta V2 \\ &= \frac{1}{2}(\Delta IL \times Resr \times M + \Delta IL \times Rs \times K) \\ &= \frac{1}{2}\left[\frac{PVDD - Vout}{L} \times Ton \times (Resr \times M + Rs \times K)\right] \\ &= \frac{1}{2}\left[\frac{PVDD - Vout}{L} \times \frac{Vout}{PVDD} \times T \times (Resr \times M + Rs \times K)\right], \end{aligned} \qquad \text{[EQ-3]}$$

where ΔV1 is the amplitude of the error signal COMP, ΔV2 is the amplitude of the current sense signal VCS, ΔIL is the variation of the inductor current IL, Ton is the on-time of the switch SW1, and T is the switch period of the switches SW1 and SW2. Since L, T, Resr, Rs, M and K are all constant, from the equation EQ-3 it is obtained $$Voffset \propto (PVDD - Vout) \times \frac{Vout}{PVDD}. \qquad \text{[EQ-4]}$$

The offset Voffset will result in the output voltage Vout not equal to the reference voltage Vref when the inductor current IL is zero. The equation EQ-4 shows that the variable parameters related to the offset Voffset comprise the input voltage PVDD and output voltage Vout, and it is therefore difficult to implement the equation EQ-3 by circuit to eliminate the ripple effect resulted from the error signal COMP and current sense signal VCS.

Therefore, it is desired a control method and apparatus to eliminate the ripple effect resulted from the error signal and current sense signal for a voltage regulator.

SUMMARY OF THE INVENTION

Accordingly, the present invention is to provide a control method and apparatus for voltage regulator, by which the ripple effect resulted from the error signal and current sense signal may be eliminated.

According to the present invention, a current feed-through adaptive voltage position control is provided for a voltage regulator, which uses ramp injection and offset injection to supply ramp signal and offset signal, respectively, to modify the PWM signal of the voltage regulator, thereby eliminating the offset of the output voltage of the voltage regulator resulted from low gain effect.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
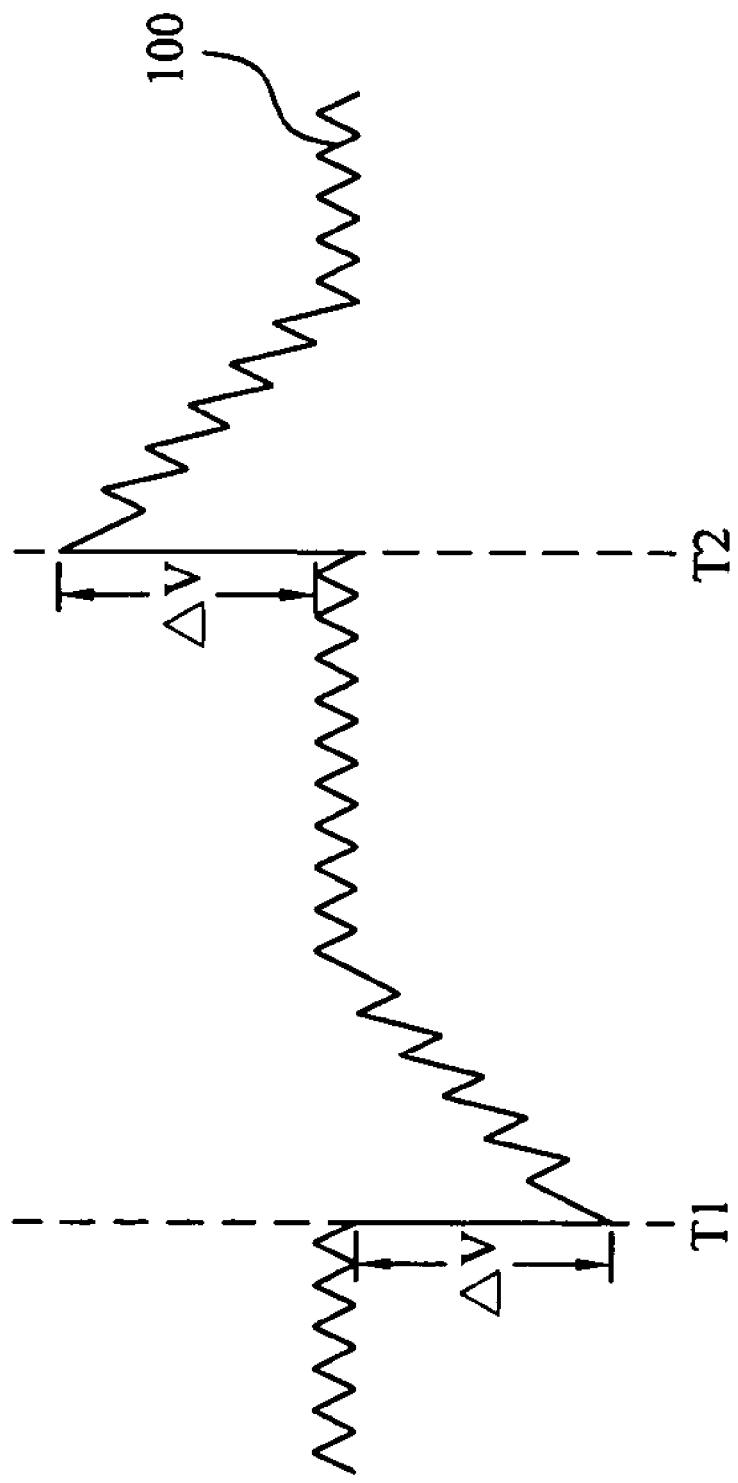
FIG. 1 shows waveform of the output voltage of a conventional voltage regulator in load transient.
Figure 2:
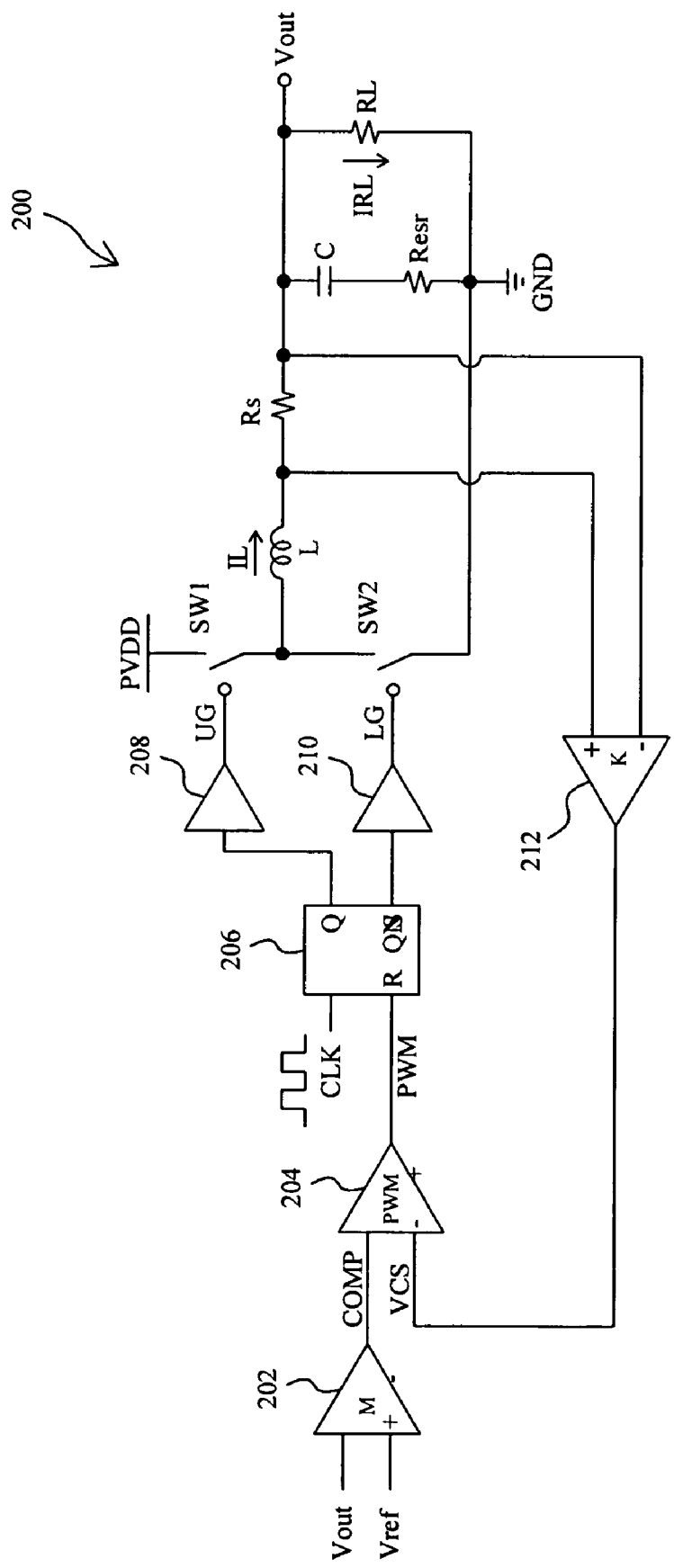
FIG. 2 shows a conventional current mode voltage regulator having voltage droop function.
Figure 3:
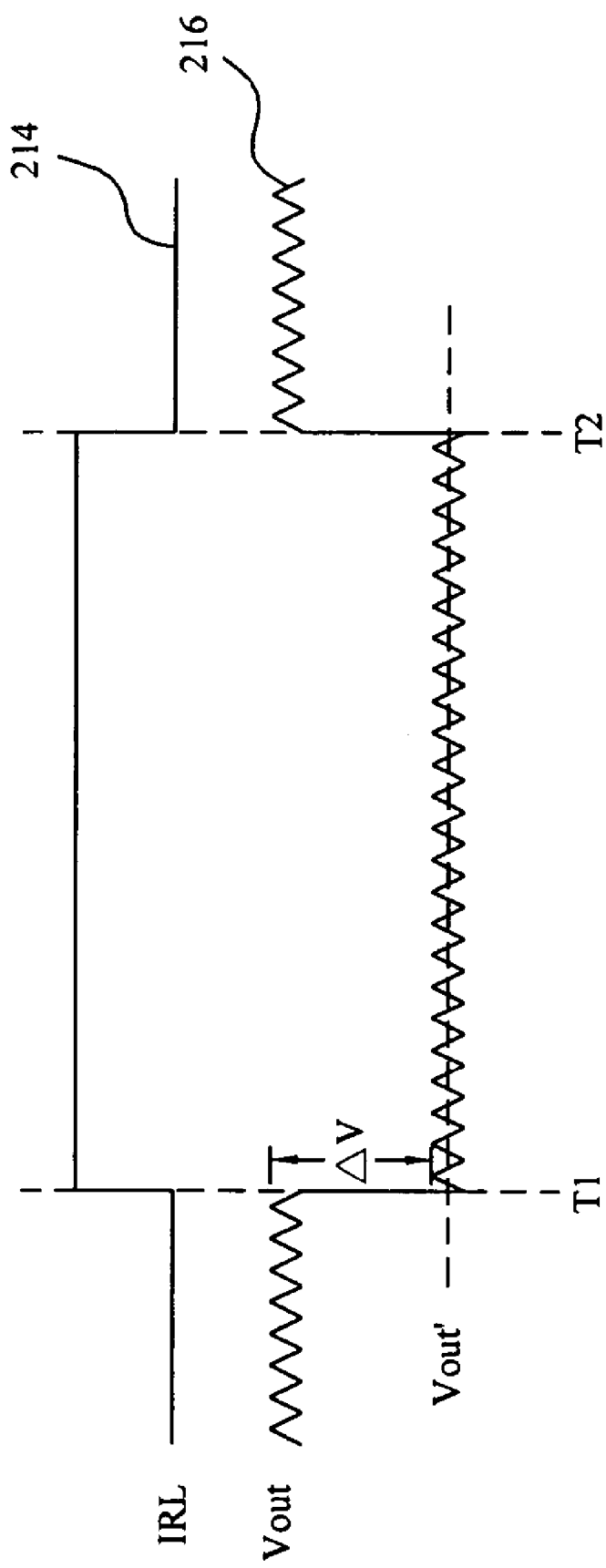
FIG. 3 shows waveforms of the load current and output voltage of the voltage regulator shown in FIG. 2 in load transient.
Figure 4:
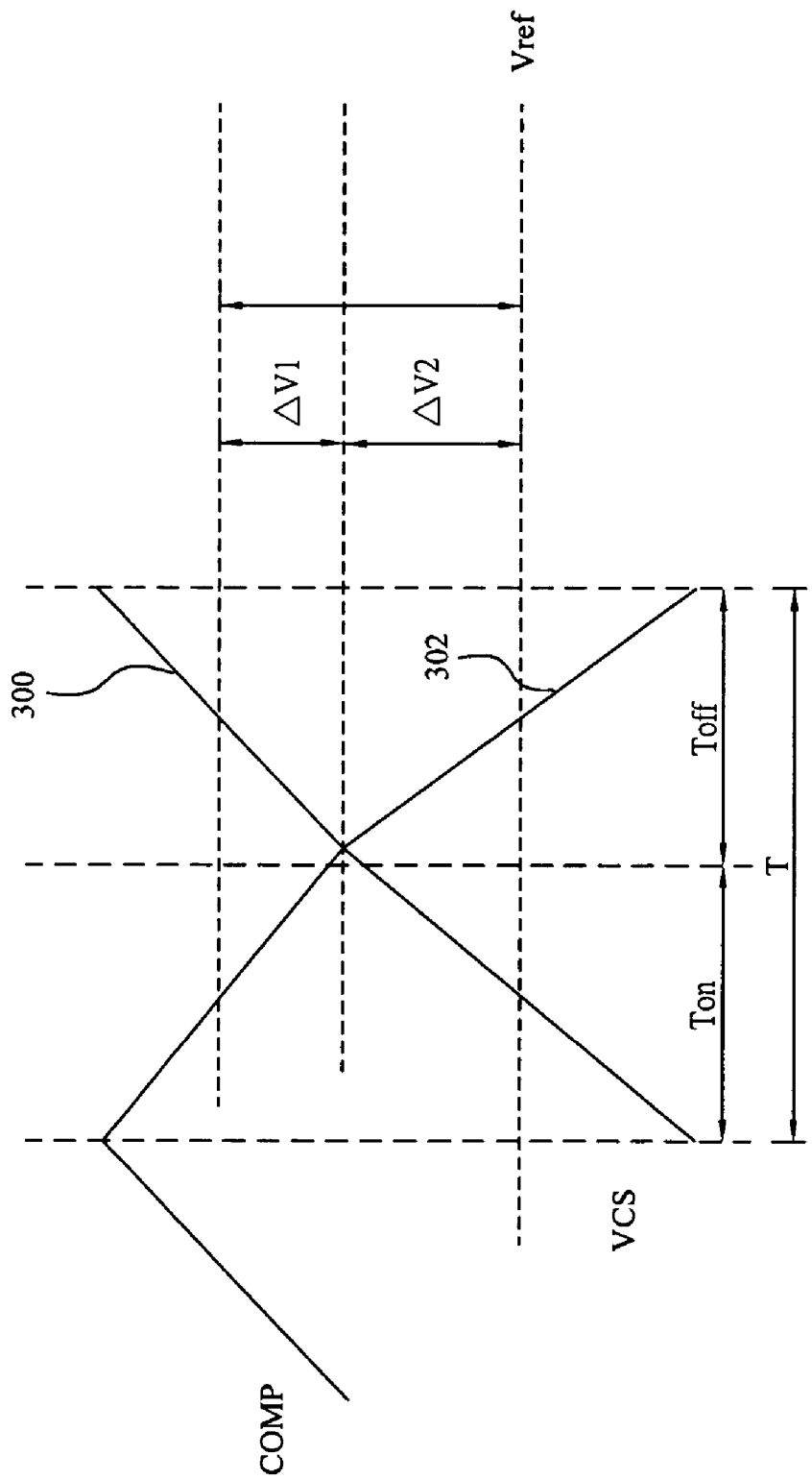
FIG. 4 shows waveforms of the error signal and current sense signal when the gain of the error amplifier in the voltage regulator shown in FIG. 2 is not large enough.
Figure 5:
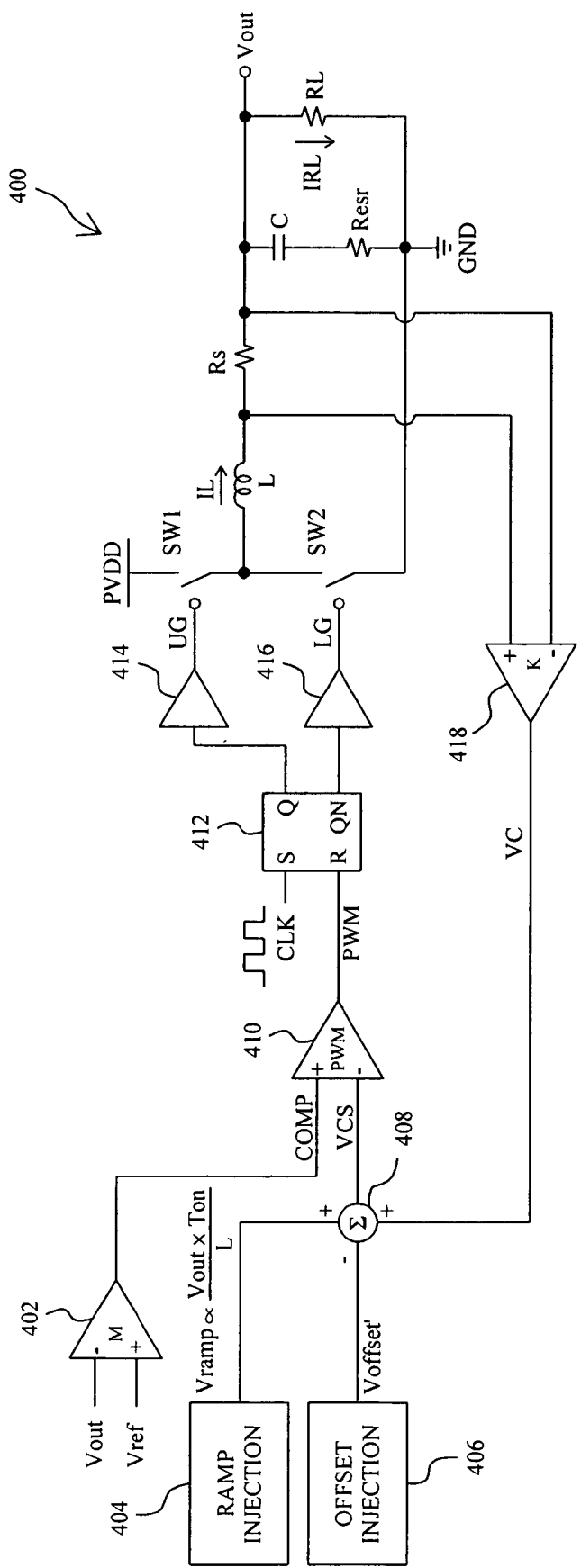
FIG. 5 shows first embodiment according to the present invention.
Figure 6:
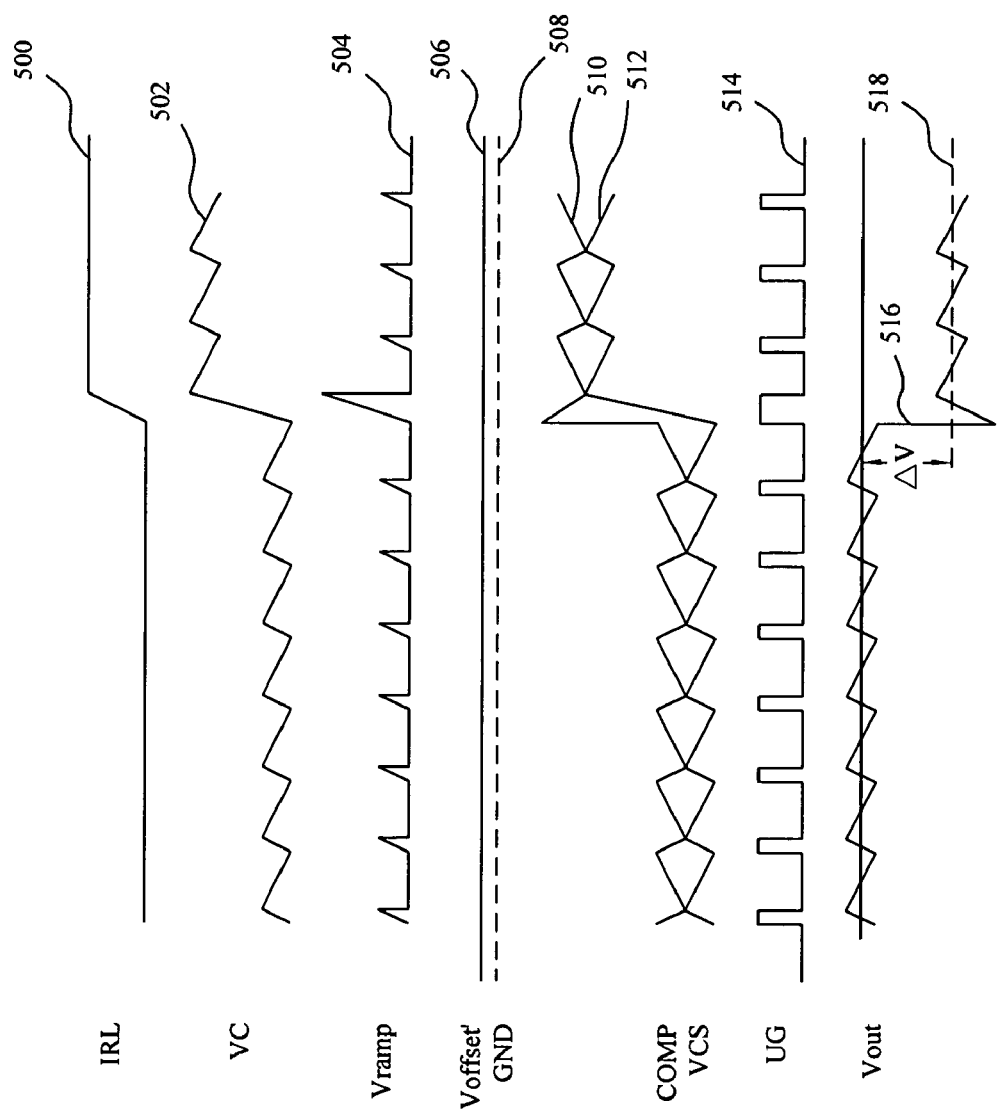
FIG. 6 shows waveforms of various signals in the voltage regulator of FIG. 5.

FIG. 5 shows first embodiment according to the present invention, and FIG. 6 shows waveforms of various signals in the voltage regulator 400 of FIG. 5. In the current mode voltage regulator 400, switches SW1 and SW2 are coupled in series between input voltage PVDD and ground GND, SR latch 412 produces signals UG and LG in response to fixed-frequency clock CLK and PWM signal to switch the switches SW1 and SW2 with drivers 414 and 416, respectively, to produce inductor current IL flowing through inductor L to charge output capacitor C to thereby generate the output voltage Vout, error amplifier 402 of low gain M generates error signal COMP from the difference between the output voltage Vout and reference voltage Vref to provide for the non-inverting input of PWM comparator 410, transconductive amplifier 418 of gain K serves as current sense circuit whose two inputs are coupled to the two ends of sense resistor Rs coupled in series to the inductor L to sense the inductor current IL to thereby generate current sense signal VC coupled to positive input of summing circuit 408, and ramp injection circuit 404 supplies ramp signal Vramp to another positive input of the summing circuit 408 following the relationship $$Vramp \propto \frac{Vout \times Ton}{L}, \quad [\text{EQ-5}]$$

where Ton is the on-time of the high side switch SW1. In addition, offset injection circuit 406 supplies offset voltage Voffset' to negative input of the summing circuit 408, and the summing circuit 408 combines the current sense signal VC, ramp signal Vramp, and offset signal Voffset' to generate signal VCS coupled to the inverting input of the PWM comparator 410. In FIG. 6, waveform 500 represents the load current IRL, waveform 502 represents the current sense signal VC, waveform 504 represents the ramp signal Vramp, waveform 506 represents the offset voltage Voffset', waveform 508 represents ground potential, waveform 510 represents the error signal COMP, waveform 512 represents the signal VCS, waveform 514 represents the signal UG, and waveform 516 represents the output voltage Vout. When the clock CLK transits from low to high, the high side switch SW1 is turned on accordingly, and therefore, the error signal COMP begins to decrease, and the signal VCS rises. Until the error signal COMP equal to the signal VCS, the PWM signal produced by the PWM comparator 410 transits from high to low, thereby turning off the high side switch SW1.

In this embodiment, the ramp signal Vramp simulates the rising slope of the inductor current IL, and therefore the ramp injection circuit 404 behaves as a slope compensation circuit. Assuming that the ramp injection circuit 404 supplies the ramp signal $$Vramp = \frac{Vout}{L} \times Ton \times (Resr \times M + Rs \times K), \quad [\text{EQ-6}]$$

it is equivalently introducing two signals having the values of Vout/L×Ton×Resr×M and Vout/L×Ton×Rs×K into the error signal COMP and current sense signal VC, respectively. As a result, the equation EQ-3 may be modified to be $$\begin{aligned} Voffset' &= \frac{1}{2}(\Delta IL \times Resr \times M + \Delta IL \times Rs \times K + \\ &\quad \frac{Vout \times Ton \times Resr \times M}{L} + \frac{Vout \times Ton \times Rs \times K}{L}) \\ &= \frac{1}{2}\left[\frac{PVDD - Vout}{L} \times \frac{Vout}{PVDD} \times T \times \right. \\ &\quad (Resr \times M + Rs \times K) + \frac{Vout}{L} \times \\ &\quad \left. \frac{Vout}{PVDD} \times T \times (Resr \times M + Rs \times K)\right] \\ &= \frac{1}{2}\left[\frac{Vout}{L} \times T \times (Resr \times M + Rs \times K)\right], \end{aligned} \quad [\text{EQ-7}]$$

In the equation EQ-7, L, T, Resr, Ra, M and K are all constant, only Vout is variable, and it is therefore easy to implement the offset injection circuit 406 for supplying the offset voltage Voffset'. Only by subtracting the offset voltage Voffset' from the ramp signal Vramp, the offset Voffset of the output voltage Vout caused by the ripple effect resulted from the error signal COMP and current sense signal VC is obtained. In other words, by using the ramp signal Vramp and offset voltage Voffset', the offset Voffset of the output voltage Vout caused by the ripple effect resulted from the error signal COMP and current sense signal VC may be eliminated such that the output voltage Vout will be equal to the reference voltage Vref when the inductor current IL is zero.

Referring to FIGS. 5 and 6, when the load RL on the voltage regulator 400 changes from light to heavy, the load current IRL increases, as shown by the waveform 500, and the output voltage Vout drops down rapidly with the voltage drop $$\Delta V = IRL \times Rs \times \frac{K}{M}, \quad [\text{EQ-8}]$$

as shown by the waveform 516. The error signal COMP increases due to the decreasing output voltage Vout. On the other hand, as the load current IRL increases, the current sense signal VC increases correspondingly, thereby the signal VCS increasing. As shown by the waveform 506, the offset voltage Voffset' maintains constant, which represents the increased values of the error signal COMP and signal VCS are equal to each other, and thereby the output voltage Vout may be maintained at the lower level 518 after it drops down.

Figure 7:
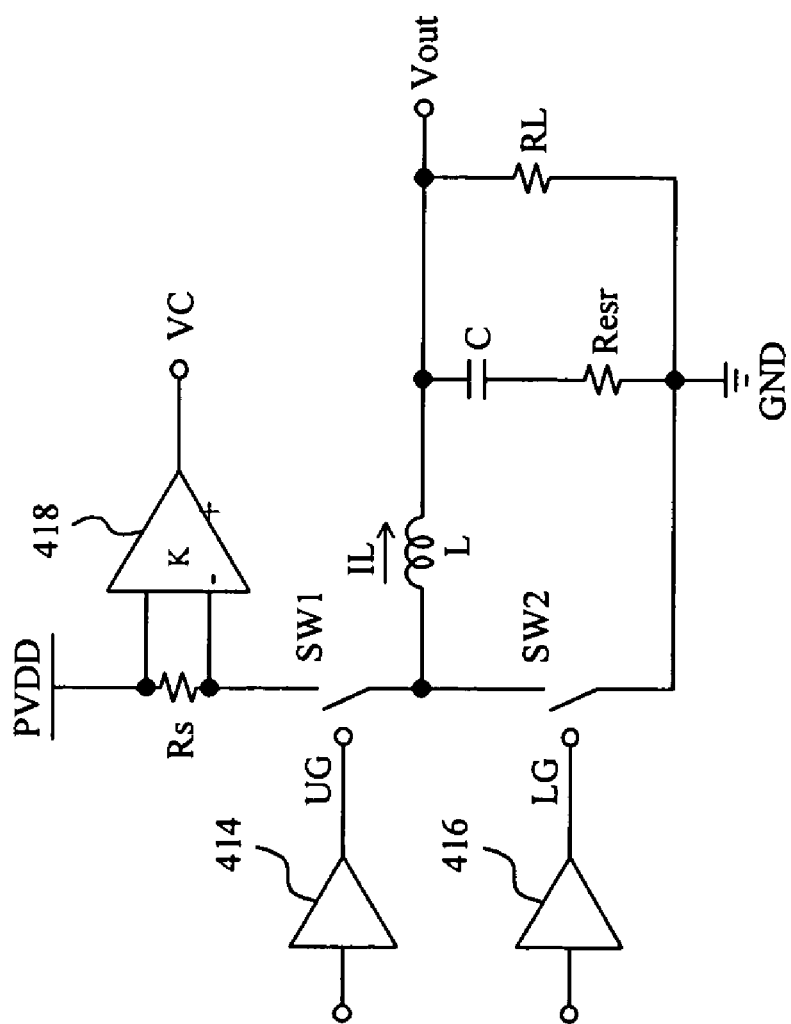
FIG. 7 shows second embodiment for sensing the inductor current IL in the voltage regulator of FIG. 5.
Figure 8:
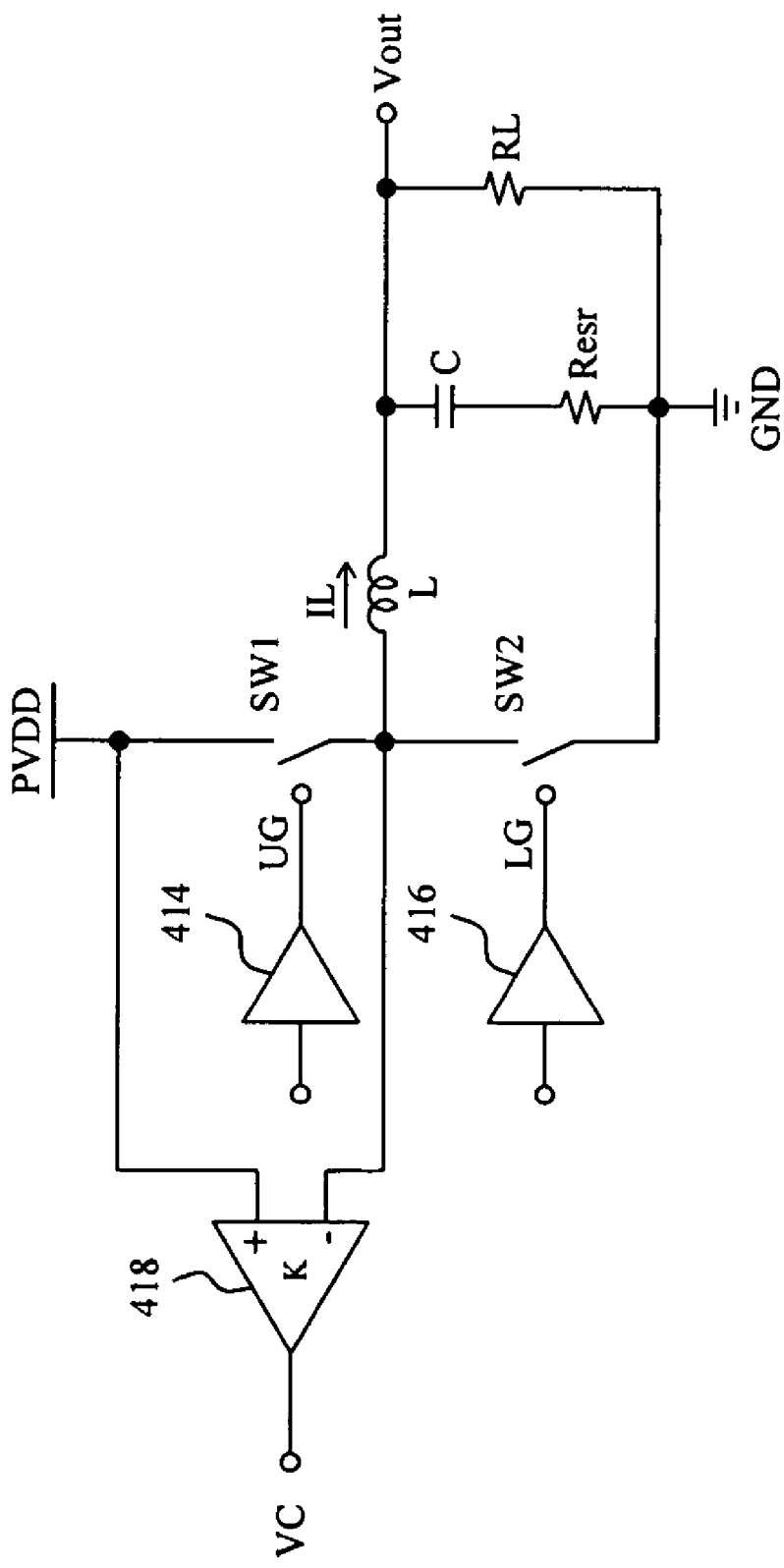
FIG. 8 shows third embodiment for sensing the inductor current IL in the voltage regulator of FIG. 5.
Figure 9:
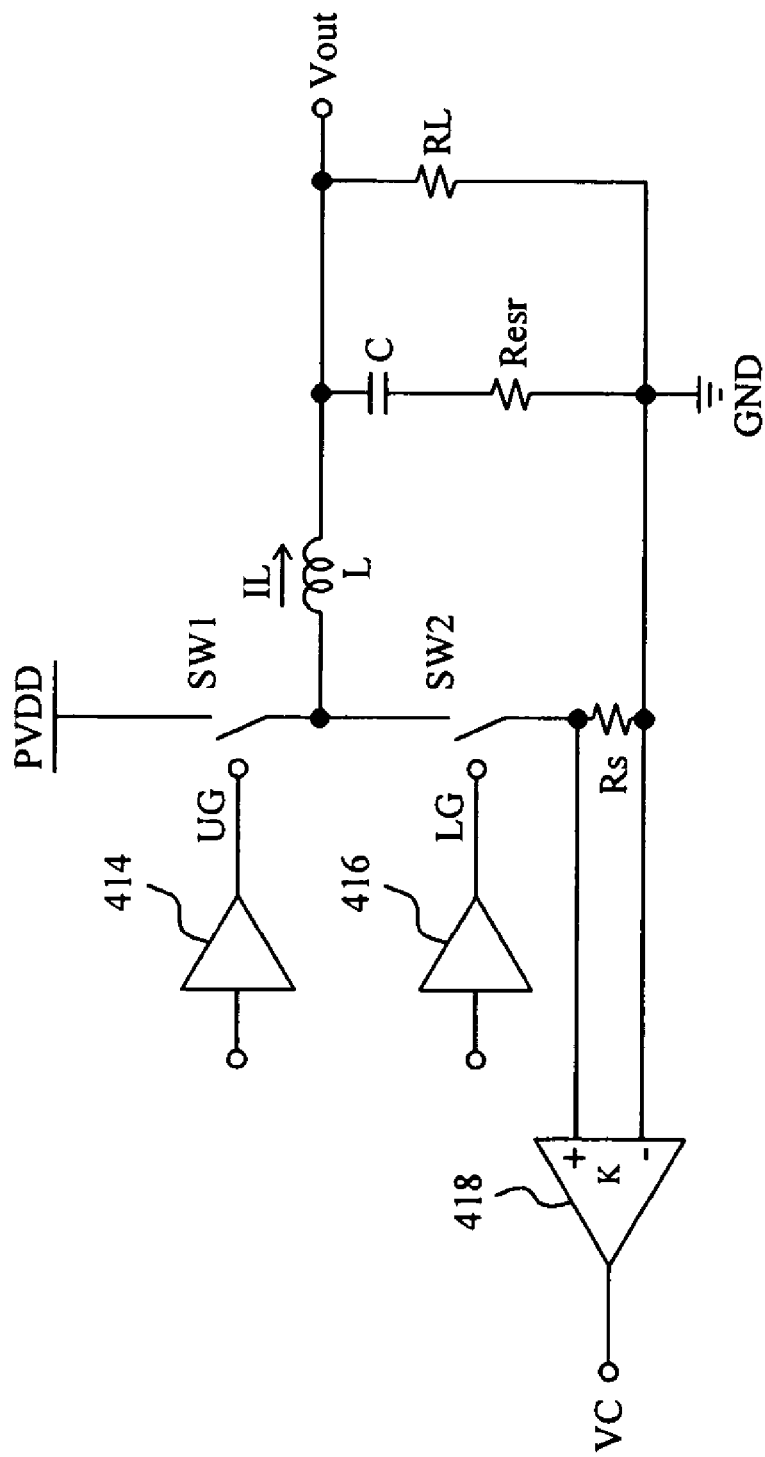
FIG. 9 shows fourth embodiment for sensing the inductor current IL in the voltage regulator of FIG. 5.
Figure 10:
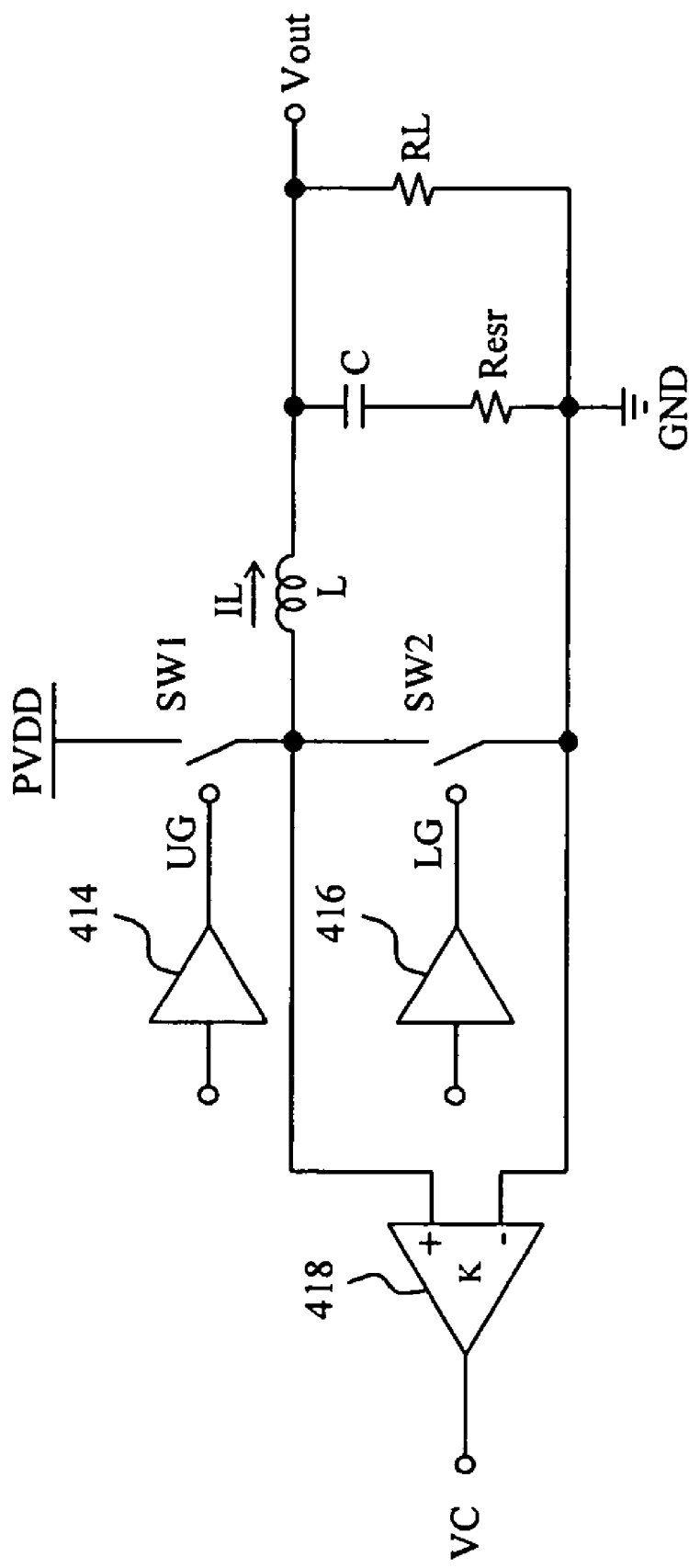
FIG. 10 shows fifth embodiment for sensing the inductor current IL in the voltage regulator of FIG. 5.

In this embodiment, the current sense signal VC is generated by the transconductive amplifier 418 based on the voltage drop across the sense resistor Rs coupled in series to the inductor L, while in other embodiments, it may be generated by alternative scheme, such as shown in FIGS. 7 to 10. In FIG. 7, the sense resistor Rs is coupled between the input voltage PVDD and high side switch SW1, and the transconductive amplifier 418 generates the current sense signal VC based on the voltage drop across the sense resistor Rs. In FIG. 8, the transconductive amplifier 418 generates the current sense signal VC based on the voltage drop across the high side switch SW1 directly. In FIG. 9, the sense resistor Rs is coupled between the low side switch SW2 and ground GND, and the transconductive amplifier 418 generates the current sense signal VC based on the voltage drop across the sense resistor Rs. In FIG. 10, the transconductive amplifier 418 generates the current sense signal VC based on the voltage drop across the low side switch SW2 directly.

Further, in other embodiments, the ramp signal Vramp, offset voltage Voffset' and current sense signal VC may be combined to the non-inverting input of the PWM comparator 410, or either one of the ramp signal Vramp and offset voltage Voffset' is coupled to the input of the error amplifier 402, and the other one coupled to the input of the PWM comparator 410. In such cases, the phases of these signals and the corresponding gains should be modified according to the realized situations.

Figure 11:
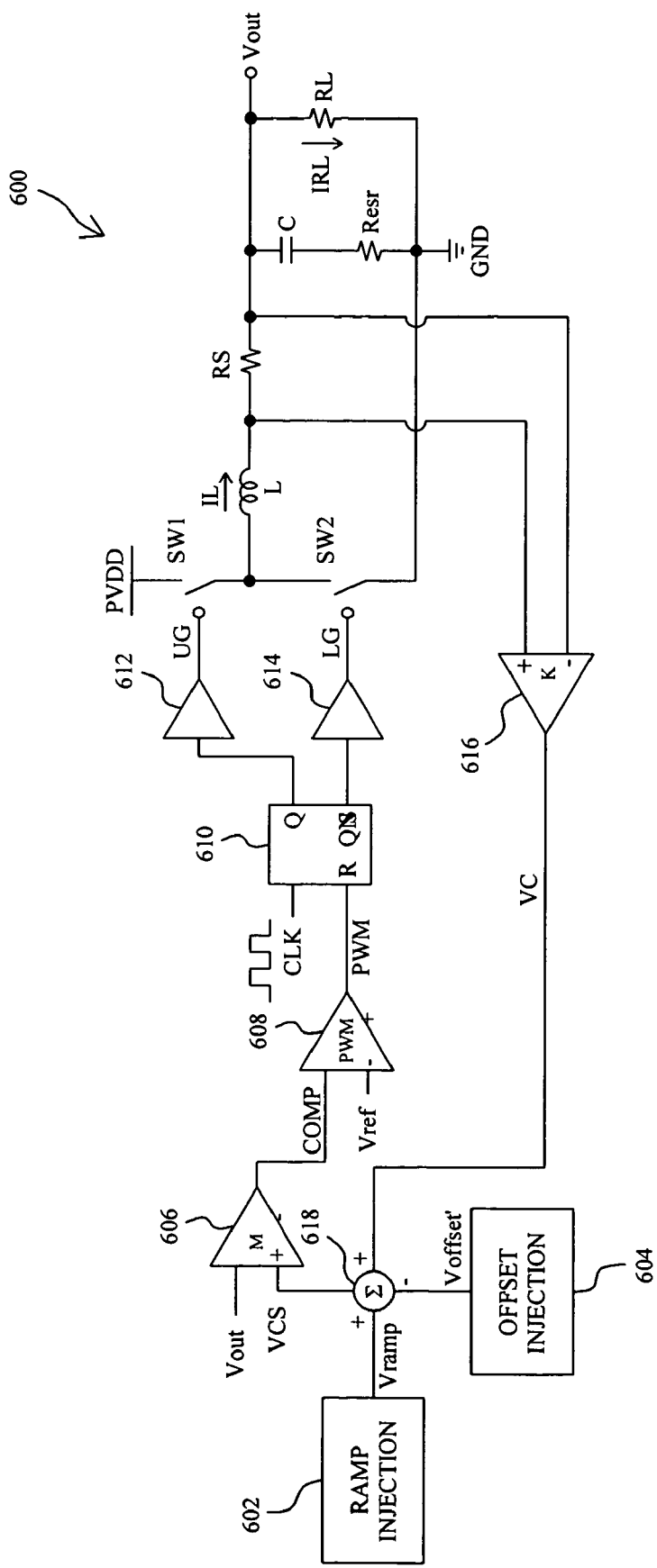
FIG. 11 shows second embodiment according to the present invention.

FIG. 11 shows second embodiment according to the present invention. In voltage regulator 600, PWM comparator 608 compares the error signal COMP produced by error amplifier 606 with reference voltage Vref to generate PWM signal, SR latch 610 produces signals UG and LG in response to fixed-frequency CLK and PWM signal to switch switches SW1 and SW2 with drivers 612 and 614, respectively, to produce inductor current IL flowing through inductor L to charge output capacitor C to thereby generate output voltage Vout, transconductive amplifier 616 serves as current sense circuit to generate current sense signal VC based on the voltage drop across sense resistor Rs coupled in series to the inductor L to couple to positive input of summing circuit 618, ramp injection circuit 602 supplies ramp signal Vramp to another positive input of the summing circuit 618, offset injection circuit 604 supplies offset voltage Voffset' to negative input of the summing circuit 618, the summing circuit 618 combines the current sense signal VC, offset voltage Voffset' and ramp signal Vramp to generate signal VCS for the non-inverting input of the error amplifier 606, and the error amplifier 606 compares the output voltage Vout with the signal VCS to produce the error signal COMP for the non-inverting input of the PWM comparator 608. The ramp signal Vramp in this embodiment also follows the equation EQ-5.

In this embodiment, the error signal COMP produced by the error amplifier 606 will cause the output voltage Vout having the offset $$Voffset = \frac{1}{2}(\Delta IL \times Resr + \Delta IL \times Rs \times K) \quad [\text{EQ-9}]$$
$$= \frac{1}{2}\left[\frac{PVDD\ Vout}{L} \times Ton \times (Resr + Rs \times K)\right],$$

where Resr is the parasitic resistor of the output capacitor C, Ton is the on-time of the high side switch SW1, and K is the gain of the transconductive amplifier 616. Due to several parameters in the equation EQ-9, it is difficult to implement with circuit. To simplify the equation EQ-9, the current sense signal VC is introduced with ramp signal $$Vramp = \frac{Vout}{L} \times Ton \times (Resr + Rs \times K), \quad [\text{EQ-10}]$$

and then the equation EQ-9 may be modified to be $$Voffset' = \frac{1}{2}\left[\frac{PVDD\ Vout}{L} \times Ton \times (Resr + Rs \times K) + \quad [\text{EQ-11}]\right.$$
$$\left.\frac{Vout}{L} \times Ton \times (Resr + Rs \times K)\right]$$
$$= \frac{1}{2}\left[\frac{Vout}{L} \times T \times (Resr + Rs \times K)\right],$$

where T is the switch period of the switches SW1 and SW2. It is shown by the equation EQ-11 that there is only a variable parameter Vout to determine the offset voltage Voffset', and it is therefore easy to implement the offset injection circuit 604 for supplying the offset voltage Voffset'. From the equations EQ-9, EQ-10 and EQ-11, it is shown that the offset Voffset caused by the error amplifier 606 is equal to the difference between the offset voltage Voffset' and ramp signal Vramp, and therefore, by using the ramp signal Vramp and offset voltage Voffset', the offset Voffset of the output voltage Vout may be eliminated such that the output voltage Vout will be equal to the reference voltage Vref when the inductor current IL is zero.

Likewise, the schemes shown in FIGS. 7 to 10 may be used in the voltage regulator 600 to produce the current sense signal VC alternatively. Also, in other embodiments, the ramp signal Vramp, offset voltage Voffset' and current sense signal VC are all coupled to the non-inverting input of the error amplifier 606, or either one of the ramp signal Vramp and offset voltage Voffset' is coupled to the input of the error amplifier 606, and the other one coupled to the input of the PWM comparator 608. In such cases, the phases of these signals and the corresponding gains should be modified according to the realized situations.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A voltage regulator comprising:
   an error amplifier for generating a first signal related to an output voltage of the voltage regulator;
   a current sense circuit for generating a second signal related to an inductor current of the voltage regulator;
   a PWM comparator for generating a PWM signal in response to the first and second signals to regulate the output voltage;
   a ramp injection circuit for supplying a ramp signal, the ramp signal being proportional to a product of the output voltage and an on-time of the PWM signal;
   an offset injection circuit for supplying an offset signal; and
   a summing circuit having inputs coupled to the current sense circuit, the ramp injection circuit and the offset injection circuit, and an output coupled to the PWM comparator, the offset signal being subtracted from the ramp signal and applied to the second signal to modify the PWM signal, whereby an offset of the output voltage is substantially eliminated.

2. The voltage regulator of claim 1, wherein the ramp signal and offset signal are inputted to the PWM comparator.

3. The voltage regulator of claim 1, wherein the ramp signal and offset signal are input to the error amplifier.

4. The voltage regulator of claim 1 wherein the ramp signal is input to the PWM comparator, and the offset signal is input to the error amplifier.

5. The voltage regulator of claim 1, wherein the offset signal is input to the PWM comparator, and the ramp signal is input to the error amplifier.

6. A current feed-through adaptive voltage position control method for a voltage regulator, comprising the steps of:
   generating a PWM signal in response to a first signal related to an output voltage of the voltage regulator and a second signal related to an inductor current of the voltage regulator for regulating the output voltage;
   wherein the PWM signal is modified by a ramp signal, the ramp signal being proportional to a product of the output voltage and an on-time of the PWM signal, and an offset signal applied to the second signal, whereby an offset of the output voltage is substantially eliminated.

7. The control method of claim 6, wherein the PWM signal is directly modified by the ramp signal and offset signal.

8. The control method of claim 6, wherein the error signal is modified by the ramp signal and offset signal to further modify the PWM signal.

9. The control method of claim 6, wherein the ramp signal directly modifies the PWM signal, and the error signal is modified by the offset signal to further modify the PWM signal.

10. The control method of claim 6, wherein the offset signal directly modifies the PWM signal, and the error signal is modified by the ramp signal to further modify the PWM signal.

* * * * *